Oct. 15, 1963     C. L. HANCOCK     3,106,797
FISHING LINE FLOAT
Filed Jan. 11, 1962
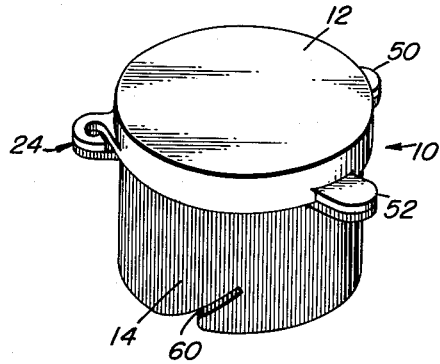
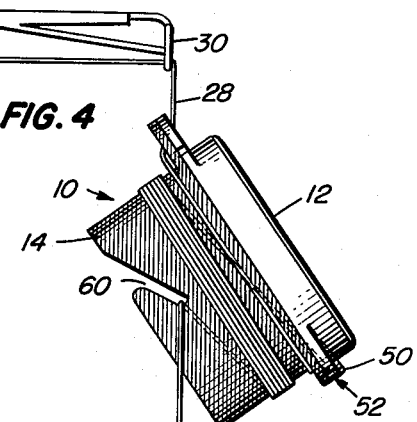
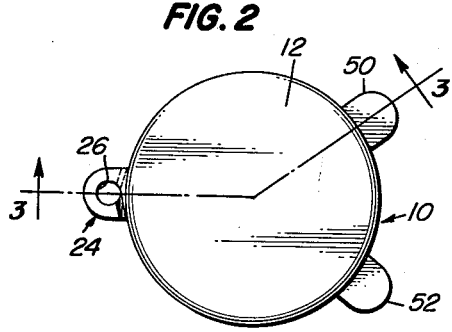
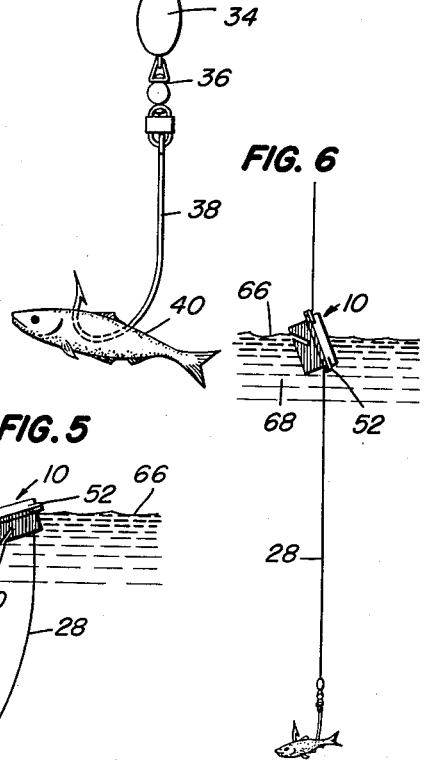
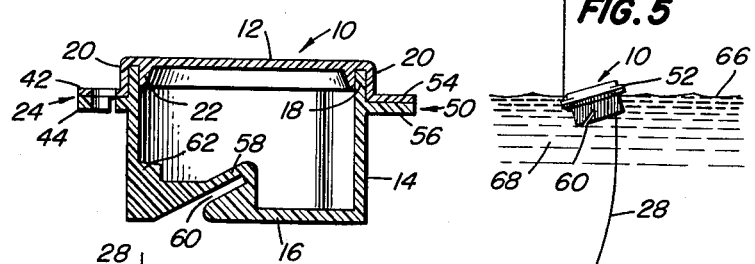
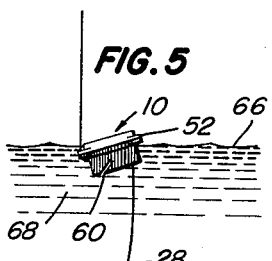
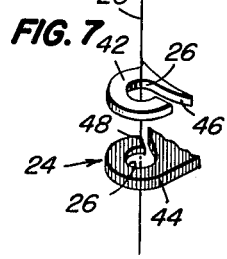
INVENTOR
Charles L. Hancock
BY *Gustave Miller*
ATTORNEY

United States Patent Office 3,106,797
Patented Oct. 15, 1963

3,106,797
FISHING LINE FLOAT
Charles L. Hancock, Hot Springs, S. Dak., assignor of one-half to Gustave Miller
Filed Jan. 11, 1962, Ser. No. 167,210
5 Claims. (Cl. 43—43.11)

This invention relates to a new and improved line holder float, or fish line bobber, especially adapted for casting with rod and reel, but also obviously suitable for use on any rod or on any fishing line.

It is a further object of this invention to provide a line holder float that is an improvement over applicant's Patent No. 2,915,847 of December 8, 1959, which improvement carries out all the objects and advantages set forth in said previous patent, as well.

Still a further object of this invention is to provide a readily visible indication of whether the baited hook and sinker are suspended in the water, or are resting on the water bottom.

Still a further object of this invention is to provide a float body which is hollow and made in two parts, of plastic material, the plastic material for one part being of contrasting color from the plastic material of the other part, whereby when the float is supporting the baited hook above the water bottom, both contrasting colors will be visible, while when the baited hook is resting on the water bottom, only one color will be visible.

Still a further object of this invention is to provide a float body made of two plastic parts secured together to provide an integral hollow float and to form closely spaced radially extending line-receiving eye and resilient line gripping holders.

Still a further object of this invention is to provide a line-receiving eye through which the fishing line can be readily threaded without removing the sinker, leader or hook from one end thereof and without removing the other end from the fishing rod.

Still a further object of this invention is to provide a float which will hold a predetermined length of line therebelow until a strike has been made, whereupon the line will readily release itself from the firm gripping action and thereafter slide freely through an eye of the float so as not to interfere either with playing fish, or landing the fish.

With the above and related objects in view, this invention consists in the details of construction and combination of parts, as will be more fully understood from the following description, when read in conjunction with the accompanying drawing, in which:

FIG. 1 is a perspective view of the float of this invention.
FIG. 2 is a top plan view of FIG. 1.
FIG. 3 is a sectional view on line 3—3 of FIG. 2.
FIG. 4 is an elevational view of the float ready to be cast into the water.
FIG. 5 shows the position of the float when the baited hook is resting on the water bottom.
FIG. 6 shows the float tilted when the baited hook is suspended in the water above the water bottom.
FIG. 7 is an exploded perspective view of the apertured slotted lips forming the fish line receiving eye.

There is shown at 10 the float of this invention, this float 10 consisting generally of a head or lid 12 which is securely adhered to a body or barrel 14.

As shown in FIG. 3, the float 10 is hollow, and consists of two plastic pieces, the body or barrel 14, which is generally cylindrical and provided with a closed bottom 16, the other edge being open at 18, and this edge 18 is securely adhered between the outer cylindrical flange 20 of the lid 12 and an inner annular flange 22. Between the outer cylindrical flange 20 and the inner annular flange 22 there is provided an annular space substantially complementary to the edge 18 of the barrel 14, so that when the barrel edge 18 is inserted into the annulus between flanges 22 and 20 with a suitable glue or cement, a substantially integral one-piece float is provided.

The lid 12 and the barrel 14 are each made of a plastic material having suitably high impact qualities, but the color of one plastic is in contrast to the color of the other plastic material, and in this case, the barrel portion 14 is made entirely of a red plastic, while the lid portion 12 is made entirely of a white plastic, as indicated on the drawing. Inasmuch as the barrel 14 has its edge 18 extending within the flange 20 of lid 12, it is obvious that the diameter of the barrel 14 below the flange 20 will be slightly less than that of the flange 20.

Extending from the float 10 is a line receiving eye 24 which is apertured at 26 to permit the fishing line 28 to extend therethrough. The fishing line 28 may extend through a fishing rod eye 30 at the end of the fish rod 32, and at its other end is provided with a sinker 34 and attached at the end is the swivel 36 to which is secured the hook 38 and on which may be provided the bait 40.

To avoid the necessity of threading the line 28 through the aperture 26, the eye 24 is formed, as clearly illustrated in FIG. 7, of an upper lip 42 and a lower lip 44, the apertures 26 in each lip 42 and 44 being axially aligned with each other. A slot 46 extends to the aperture 26 in lip 42 from one side thereof, and a slot 48 extends to the other side of the lip 44 to its aperture 26. The lip 42 extends integrally from the flange 20 of lid 12, while the lip 44 extends integrally from the barrel 14, and these lips 42 and 44 are closely spaced, but are inherently somewhat resilient due to the quality of the plastic material, which is selected for the device—sufficiently resilient to permit the line 28 to be passed between the lips 42 and 44 until it reaches the oppositely extending slots, which are non-aligned, but which will thereby permit the line 28 to be pulled into and retained in the axially aligned apertures 26.

Slightly displaced from diametrically opposite the eye 24 on the float 10, there are provided two line holders 50 and 52, each of the line holders being made of a lip 54 integrally extending from the flange 20 of lid 12, and a correspondingly placed lip 56 integrally extending from the cylindrical wall of the barrel 14. These lips 54 and 56 are closely spaced but are somewhat resilient and permit the line 28 to be drawn between the two somewhat resilient lips and be gripped thereby and released when necessary.

The barrel bottom 16 has a thickened portion 58 on the side that is closer toward the eye 24, and a slot 60 extends angularly into this thickened portion 58 transversely of the barrel bottom 16, and hence, transversely of the float, and the angle of the slot 60 is such that it faces toward the side where the eye 24 is located. The bottom 16 is further thickened as at 62, thus serving to weight the bottom of the float toward the side on which the eye 24 is located and thereby also provides a low center of gravity for the float.

In operation, the line 28 is threaded through the eye 24 by being inserted between the lips 42 and 44 until it at the top of the float, the slot 46 in the upper lip 42 extends counter-clockwise, while the slot 48 in the lower lip can enter the slots 46 and 48, it being noted that looking 44 extends clockwise.

Then, holding the rim of the lid 12 in the left hand, with the barrel 14 in a horizontal position, the necessary length of line is drawn through the eye aperture 26 to the desired amount corresponding to the depth at which it is desired that the bait 40 and hook 38 will be suspended beneath the top 66 of the water 68. The line is then drawn clockwise, by-passing holder 52, and on around to holder 50 and immediately passed between the lips 54 and 56 of the holder 50 and thereafter wound clockwise around the lower pendent body or barrel 14 until only about twelve inches or so remain and then is temporarily inserted between lips 54 and 56 of the other holder 52. This temporarily holds the line close to the hook 38 so that the bait 40 may be placed on the hook 38 with the line held against unwinding. Then, the line is removed from the holder 52 and immediately passed through the slot 60, coming out on the side between the holder 52 and the eye 24, as illustrated in FIG. 4. The line will then be drawn close to the fishing rod eye 30 and the cast is ready to be made.

Some of the line will probably unwind while the float is being cast in flight. When the float strikes the water, the float 10 will float in a substantially level position, as shown in FIG. 5. However, if the line has not dropped out of the slot while in flight, the weighted portion 62 plus the sinker 34 will cause the float to tip until the slot 60 approaches the vertical to thus insure that the line 28 will drop out of the slot 60 and unwind from about the barrel 14 completely, but be held by the holder 50. If too great a length of line has been provided between the holder 50 and the hook and sinker, the hook and sinker will rest on the water bottom 70, whereby the float 10 will remain generally level, as seen in FIG. 5, and only the color of the lid 12, here indicated as white, will be visible to the angler. This will indicate to him that his line is too long and the bait is not suspended in the water as it should be. If, however, the line is of the proper length, not so long as to touch bottom, then when the line has completely unwound, it will still be held by the holder 50, but it will cause the float 10 to tilt substantially to the position shown in FIG. 6, making the color of the barrel, here indicated as red, also visible to the angler so that he will see both red and white and thus know that his bait is suspended above the water bottom.

When a fish takes the bait and is hooked, the pull of the fish will be sufficient to pull the line out between the lips of the holder 50, and the line then may play freely through the apertured eye 24 until the fish is being landed and then, as the line is being reeled in, the float will merely travel along the line until it approaches the sinker and thus avoid interference with reeling in the fish.

The float 10 would preferably be held in the left hand with the barrel bottom 16 extending toward the fisherman, and the line would be wound from the eye 24 to the second line holder 50 and then about the barrel and to the temporary holder 52 while being baited, and then, when baited, will be removed from temporary holder 52 and inserted through slot 60 to be ready for casting, as illustrated in FIG. 4.

Of course, when fishing near a sloping bottom, and if wind is blowing, the fisherman will be able to tell whether his baited hook is touching bottom or not merely by observing whether he can see the two colors, indicating that the baited hook is suspended, or only a single color, showing that the sinker has hit the bottom.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A float adapted to be attached to a fish line and to be cast with sinker, leader, hook and bait as a compact unit, said float comprising a buoyant hollow body having a head and pendant lower body section of rounded contours in lateral cross section, said pendant lower body being of less diameter than said head and forming a spool section to receive the fish line wound thereon, an outwardly extending eye on said float adjacent said head to receive the fish line in sliding contact therethrough, and a pair of circumferentially spaced apart holders adjacent said head to resiliently and releasably grip the line in spaced relation to said eye, the float having a low center of gravity to cause it to be buoyed with its head generally upright, there being a narrow transverse slot in the bottom surface of said pendant body, said slot facing generally toward said eye, the line being pulled through said eye to a length at which it is desired to suspend the sinker, leader, hook and bait in the water from the float, the line being then inserted into one of said holders to be resiliently and releasably gripped thereby, then wound about said pendant lower body until adjacent the hook end, then temporarily inserted into the other of said holders to be gripped thereby while the hook is being baited, then removed therefrom and inserted through said transverse slot, whereby the line and float is ready for casting, said float tilting substantially when the sinker is suspended above the bottom of the water, but floating substantially upright when the sinker rests on the bottom of the water, said pendant lower body section comprising a barrel open at one end, and said head comprising a lid securely adhered to the open end of said barrel said eye comprising a pair of closely spaced resilient lips extending radially from said float, said lips having aligned apertures, each of said lips having a slot extending through a side thereof to its aperture, said slots being completely non-aligned with each other whereby the line may be threaded into said aligned apertures of said lips by being pulled between said resilient lips into said slots and to said aperture, each said holder comprising a pair of closely spaced resilient lips extending radially from said float, one lip of each said pair extending integrally from said lid, and the other lip of each said pair extending integrally from said barrel.

2. The float of claim 1, said lid having a pair of annularly spaced integrally depending flanges, the open edge of said barrel being secured in the annulus between said depending flanges of said lid.

3. The float of claim 1, said lid and barrel each being made of a plastic material of contrasting colors thereby readily indicating whether the sinker is above the water bottom.

4. The float of claim 1, the bottom of said barrel having a thickened portion on the side toward said eye, said transverse slot extending angularly into said thickened portion.

5. The float of claim 4, said thickened portion being of a size sufficient to weight said float toward said eye side thereof.

References Cited in the file of this patent

UNITED STATES PATENTS

| | | |
|---|---|---|
| 682,954 | Olson | Sept. 17, 1901 |
| 2,718,085 | Bean | Sept. 20, 1955 |
| 2,915,847 | Hancock | Dec. 8, 1959 |
| 2,969,999 | Marsh | Dec. 27, 1960 |
| 3,011,285 | Musser | Dec. 5, 1961 |